United States Patent
Emge et al.

(10) Patent No.: US 8,293,807 B2
(45) Date of Patent: Oct. 23, 2012

(54) METHOD FOR THE PRODUCTION OF RIGID POLYURETHANE FOAM

(75) Inventors: Andreas Emge, Lemfoerde (DE); Daniel Freidank, Ludwigshafen (DE); Holger Seifert, Bohmte (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 170 days.

(21) Appl. No.: 12/439,826

(22) PCT Filed: Sep. 6, 2007

(86) PCT No.: PCT/EP2007/059345
§ 371 (c)(1),
(2), (4) Date: Mar. 4, 2009

(87) PCT Pub. No.: WO2008/031757
PCT Pub. Date: Mar. 20, 2008

(65) Prior Publication Data
US 2009/0209671 A1    Aug. 20, 2009

(30) Foreign Application Priority Data

Sep. 15, 2006   (EP) .................................. 06120725

(51) Int. Cl.
*C08G 18/28* (2006.01)
(52) U.S. Cl. ........ 521/134; 521/130; 521/131; 521/135; 521/137; 521/139; 521/164; 521/167; 521/170; 521/174
(58) Field of Classification Search .................. 521/137, 521/170, 174, 130, 131, 134, 135, 139, 164, 521/167
See application file for complete search history.

(56) References Cited

U.S. PATENT DOCUMENTS

| | | | |
|---|---|---|---|
| 4,242,249 A | 12/1980 | Van Cleve et al. | |
| 4,652,589 A | 3/1987 | Simroth et al. | |
| 4,866,102 A | 9/1989 | Pray et al. | |
| 4,997,857 A | 3/1991 | Timberlake et al. | |
| 6,013,731 A * | 1/2000 | Holeschovsky et al. ...... 525/123 |
| 7,759,423 B2 | 7/2010 | Chauk | |
| 2006/0025491 A1 | 2/2006 | Adkins et al. | |
| 2006/0025558 A1 | 2/2006 | Adkins et al. | |
| 2006/0058409 A1 | 3/2006 | Zaschke et al. | |
| 2007/0254973 A1 | 11/2007 | Emge et al. | |
| 2007/0282029 A1 | 12/2007 | Hager et al. | |

FOREIGN PATENT DOCUMENTS

| | | |
|---|---|---|
| EP | 0 190 769 A2 | 8/1986 |
| EP | 0 262 653 A2 | 4/1988 |
| EP | 0 316 788 | 5/1989 |
| EP | 1 098 923 B1 | 5/2001 |
| EP | 1 108 514 | 6/2001 |
| EP | 1 624 004 A1 | 2/2006 |
| EP | 1 624 005 A1 | 2/2006 |
| GB | 1 559 121 | 1/1980 |
| JP | 11 60651 | 3/1999 |
| JP | 2000 169541 | 6/2000 |
| WO | WO 00/00531 A1 | 1/2000 |
| WO | WO 03/078496 A1 | 9/2003 |
| WO | 2004 035650 | 4/2004 |
| WO | 2005 097863 | 10/2005 |
| WO | WO 2007/142822 A1 | 12/2007 |

\* cited by examiner

*Primary Examiner* — John Cooney
(74) *Attorney, Agent, or Firm* — Oblon, Spivak, McClelland, Maier & Neustadt, L.L.P.

(57) ABSTRACT

The invention relates to a process for producing rigid polyurethane foams by reacting
a) polyisocyanates with
b) compounds having at least two hydrogen atoms which are reactive toward isocyanate groups in the presence of
c) blowing agents,
wherein at least one graft polyol b1) which can be prepared by in-situ polymerization of olefinically unsaturated monomers in a polyether alcohol b1i), where the polyether alcohol b1i) has a functionality of from 2 to 4 and a hydroxyl number in the range from 100 to 250 mg KOH/g, its polyether chain comprises propylene oxide and up to 20% by weight, based on the polyether alcohol b1i), of ethylene oxide, and acrylonitrile and styrene in a weight ratio of acrylonitrile:styrene of from >1:1 to 4:1 are used as olefinically unsaturated monomers, is used as compounds having at least two hydrogen atoms which are reactive toward isocyanate groups b), and the reaction is carried out in the presence of at least one compound b1ii) which has at least one olefinic double bond and is miscible with the polyether alcohol b1i).

22 Claims, No Drawings

METHOD FOR THE PRODUCTION OF RIGID POLYURETHANE FOAM

The invention relates to a process for producing rigid polyurethane foams by reacting polyisocyanates with compounds having at least two hydrogen atoms which are reactive toward isocyanate groups.

Rigid polyurethane foams have been known for a long time and are widely described in the literature. They are usually produced by reacting polyisocyanates with compounds having at least two hydrogen atoms which are reactive toward isocyanate groups, in particular polyfunctional alcohols, as has been known for a long time and is widely described in the literature. The rigid polyurethane foams are preferably used for insulation in refrigeration appliances or for construction elements.

It is an ongoing objective to improve the properties of rigid polyurethane foams. In particular, the thermal conductivity and the demolding time should be reduced and the processability of the formative components for the rigid polyurethane foams, in particular the compatibility with the blowing agents, should always be ensured.

It has been found that the use of polyether alcohols which are prepared by in-situ polymerization of olefinically unsaturated monomers, in particular styrene and acrylonitrile, makes it possible to improve the demolding behavior of rigid polyurethane foams. Such polyols are frequently also referred to as graft polyols in industry.

Thus, WO 2004/035650 describes a process for producing rigid polyurethane foams using graft polyols. The graft polyols described there are prepared using 2-8-functional polyether alcohols and styrene and acrylonitrile, preferably in a weight ratio of 2:1, and are used in admixture with other polyols, for example polyols based on sugar, and aromatic amines such as toluenediamine for producing rigid polyurethane foams. The rigid foams described there display good curing and demoldability and good flow behavior. However, disadvantages are the unsatisfactory miscibility of the graft polyols with polyols and blowing agents and also the low storage stability of the polyol component, in particular when using hydrocarbons.

WO 2005/097863 describes a process for producing rigid polyurethane foams using graft polyols which have been prepared using polyether alcohols having a high proportion of ethylene oxide in the chain. This is said to improve the compatibility with the polyols of the formulation.

EP 1 108 514 describes a process for producing rigid foam panels, in which a graft polyol is used. This is prepared using a polyol mixture comprising a polyether alcohol having an ethylene oxide content of at least 40% by weight. These foams are said to display reduced shrinkage.

JP 2000 169541 describes rigid polyurethane foams having an improved mechanical strength and a low shrinkage. They were produced using a graft polyol prepared exclusively using acrylonitrile as monomer.

JP 11060651, too, describes a process for producing rigid polyurethane foams using graft polyols prepared using a polyether alcohol having a content of at least 40% by weight of ethylene oxide.

However, the use of such high amounts of ethylene oxide in the graft polyols also has disadvantages. Thus, the solubility of the hydrocarbons usually used as blowing agents in such polyols is poorer. Furthermore, such polyols have an increased intrinsic reactivity. This reduces the opportunities of controlling polyurethane formation by means of catalysts.

EP 1 108 514 describes formulations comprising polyols which do not form a phase-stable polyol component with graft polyols at an ethylene oxide content of less than 20% by weight.

It was an object of the present invention to develop a process for producing rigid polyurethane foams which display a short demolding time, good mechanical properties and a low thermal conductivity and can be produced without problems, and in particular give a good phase stability of the polyol component including blowing agent.

This object is achieved by using a polyol component comprising a graft polyol which has a functionality of from 2 to 4 and a hydroxyl number in the range from 100 to 250 mg KOH/g and whose polyether chain comprises propylene oxide and up to 20% by weight, based on the polyether alcohol b1i), of ethylene oxide and in which acrylonitrile and styrene in a ratio of acrylonitrile:styrene of from >1:1 to 4:1 are used as olefinically unsaturated monomers and carrying out the reaction in the presence of at least one compound which has at least one olefinic double bond and is miscible with the polyether alcohol b1i).

The invention accordingly provides a process for producing rigid polyurethane foams by reacting
a) polyisocyanates with
b) compounds having at least two hydrogen atoms which are reactive toward isocyanate groups in the presence of
c) blowing agents,
wherein at least one graft polyol b1) which can be prepared by in-situ polymerization of olefinically unsaturated monomers in a polyether alcohol b1i), where the polyether alcohol b1i) has a functionality of from 2 to 4 and a hydroxyl number in the range from 100 to 250 mg KOH/g, its polyether chain comprises propylene oxide and up to 20% by weight, based on the polyether alcohol b1i), of ethylene oxide, and acrylonitrile and styrene in a ratio of acrylonitrile:styrene of from >1:1 to 4:1 are used as olefinically unsaturated monomers, is used as compounds having at least two hydrogen atoms which are reactive toward isocyanate groups b), and the reaction is carried out in the presence of at least one compound which has at least one olefinic double bond and is miscible with the polyether alcohol b1i).

The invention further provides the rigid polyurethane foams produced by this process.

The graft polyols b1) are, as described, prepared by in-situ polymerization of olefinically unsaturated monomers in polyether alcohols b1i), hereinafter also referred to as carrier polyols, in the presence of a compound, hereinafter also referred to as macromer, which has at least one olefinic double bond and is miscible with the polyether alcohols b1i).

The graft polyols preferably have a hydroxyl number in the range 40-150 mg KOH/g.

As carrier polyols b1i), preference is given to using ones having a functionality of from 2 to 4, in particular from 3 to 4. They are usually prepared by addition of alkylene oxides, in particular propylene oxide or mixtures of propylene oxide and ethylene oxide comprising a maximum of 20% by weight, based on the weight of the polyether alcohol b1i), of ethylene oxide, onto H-functional starter substances. The starter substances are usually alcohols or amines having the appropriate functionality. Starter substances which are preferably used are ethylene glycol, propylene glycol, glycerol, trimethylolpropane, ethylenediamine and toluenediamine (TDA). The carrier polyols are prepared by the customary and known processes for preparing polyether alcohols, as described in more detail below.

The carrier polyols are preferably used individually, but it is also possible to use them in the form of any mixtures with one another.

The polymerization of olefinically unsaturated monomers in polyether alcohols b1i) is carried out in the presence of at least one compound b1ii), also referred to as macromer or stabilizer, which has at least one olefinic double bond and is miscible with the polyether alcohol b1i). The macromers are linear or branched polyether alcohols having molecular weights of ≧1000 g/mol and comprising at least one terminal, reactive olefinically unsaturated group. The olefinically unsaturated group can be inserted into an existing polyol b1ii) by reaction with carboxylic anhydrides such as maleic anhydride (MA), fumaric acid, acrylate and methacrylate derivatives and also isocyanate derivatives such as 3-isopropenyl-1,1-dimethylbenzyl isocyanate (TMI), isocyanatoethyl methacrylates. A further route is preparation of a polyol by alkoxylation of propylene oxide and ethylene oxide using starter molecules having hydroxyl groups and olefinic unsaturation. Examples of such macromers are described, for example, in U.S. Pat. No. 4,390,645, U.S. Pat. No. 5,364,906, EP 0 461 800 and U.S. Pat. No. 6,013,731. They have to be soluble in the carrier polyol. The macromers preferably have a molecular weight of from 300 to 30 000 g/mol.

The polyols b1ii) are preferably polyether alcohols obtained by addition of alkylene oxides onto H-functional starter substances, in particular polyfunctional, in particular 2- to 8-functional, alcohols. Examples are ethylene glycol, propylene glycol, glycerol, trimethylolpropane, sorbitol and sucrose. In a particularly preferred embodiment, sorbitol or sucrose is used as starter substance. These polyols are particularly preferably reacted with MA or TMI to form the macromer.

During the free-radical polymerization, the macromers are incorporated into the copolymer chain. This forms block copolymers which have a polyether block and a poly(acrylonitrile-styrene) block and act as phase compatibilizers at the interface of continuous phase and disperse phase and suppress agglomeration of the graft polyol particles. The proportion of macromers is usually from 1 to 15% by weight, based on the total weight of the monomers used for preparing the graft polyol.

The preparation of graft polyols is usually carried out using customary moderators, also referred to as chain transfer agents. The use and function of these moderators is described, for example, in U.S. Pat. No. 4,689,354, EP 0 365 986, EP 0 510 533 and EP 0 640 633. The moderators effect chain transfer of the growing free radical and thus reduce the molecular weight of the copolymers being formed, as a result of which crosslinking between the polymer molecules is reduced, which in turn influences the viscosity and the dispersion stability and also the filterability of the graft polyols. The proportion of moderators is usually from 0.5 to 25% by weight, based on the total weight of the monomers used for preparing the graft polyol. Moderators which are customarily used for preparing graft polyols are alcohols such as 1-butanol, 2-butanol, isopropanol, ethanol, methanol, cyclohexane, toluene, mercaptans such as ethanethiol, 1-heptanethiol, 2-octanethiol, 1-dodecanethiol, thiophenol, 2-ethylhexyl thioglycolate, methyl thioglycolate, cyclohexyl mercaptan and also enol ether compounds, morpholines and α-(benzoyloxy)styrene.

To initiate the free-radical polymerization, it is usual to use peroxide or azo compounds, e.g. dibenzoyl peroxide, lauroyl peroxide, t-amyl peroxy-2-ethylhexanoate, di-t-butyl peroxide, diisopropyl peroxy carbonate, t-butyl peroxy-2-ethylhexanoate, t-butyl perpivalate, t-butyl perneodecanoate, t-butyl perbenzoate, t-butyl percrotonate, t-butyl perisobutyrate, t-butyl peroxy-1-methylpropanoate, t-butyl peroxy-2-ethylpentanoate, t-butyl peroxyoctanoate and di-t-butyl perphthalate, 2,2'-azobis(2,4-dimethylvaleronitrile), 2,2'-azobisisobutyronitrile (AIBN), dimethyl-2,2'-azobisisobutyrate, 2,2'-azobis(2-methylbutyronitrile) (AMBN), 1,1'-azobis(1-cyclohexanecarbonitrile). The proportion of initiators is usually from 0.1 to 6% by weight, based on the total weight of the monomers used for preparing the graft polyol.

Owing to the reaction rate of the monomers and the half life of the initiators, the free-radical polymerization for preparing graft polyols is usually carried out at temperatures of from 70 to 150° C. and a pressure of up to 20 bar. Preferred reaction conditions for preparing graft polyols are temperatures of from 80 to 140° C. and a pressure in the range from atmospheric pressure to 15 bar.

The graft polyols b1) preferably have a content of polymerized particles, also referred to as solids content, of at least 35% by weight, based on the weight of the graft polyol. A solids content of 65% by weight should usually not be exceeded, since otherwise the viscosity of the polyols increases too much and problems can thus occur in processing.

The graft polyols b1) preferably have a particle size of the polymers of from 0.1 μm to 8 μm, preferably from 0.2 μm to 4 μm, with a maximum in the particle size at from 0.2 to 3 μm, preferably from 0.2 to 2.0 μm.

In a further preferred embodiment of the graft polyols b1), the particle size distribution is bimodal, i.e. the distribution curve of the particle size has two maxima. Such graft polyols can be prepared, for example, by mixing graft polyols having a monomodal particle size distribution and a different particle size in the appropriate ratio but can also be prepared by using a polyol comprising polymers of olefinically unsaturated monomers as carrier polyol in the initial charge for the reaction. In this embodiment, too, the particle size is in the above-described range.

The graft polyols b1) can be prepared in continuous processes and discontinuous processes. The synthesis of graft polyols by either process is known and is described in a series of examples. Thus, the synthesis of graft polyols by the semi-batch process is described in the following patents: EP 439 755 and U.S. Pat. No. 4,522,976. A special form of the semi-batch process is the semibatch seed process in which a graft polyol is additionally used as seed in the initial charge for the reaction, for example as described in EP 510 533 and EP 698 628. The synthesis of graft polyols by a continuous process is likewise known and is described, inter alia, in WO 00/59971 and WO 99/31160.

The graft polyol b1) can in principle be used as sole compound having at least two hydrogen atoms which are reactive toward isocyanate groups b). However, preference is given to using this compound b1) in admixture with other compounds having at least two hydrogen atoms which are reactive toward isocyanate groups.

For this purpose, the customary and known compounds having at least two hydrogen atoms which are reactive toward isocyanate groups can preferably be used. Preference is given to using polyether alcohols and/or polyester alcohols in combination with the graft polyols b1).

The polyester alcohols used together with the graft polyols b1) are usually prepared by condensation of polyfunctional alcohols, preferably diols, having from 2 to 12 carbon atoms, preferably from 2 to 6 carbon atoms, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthalenedicarboxylic acids.

The polyether alcohols used together with the graft polyols b1) usually have a functionality of from 2 to 8, in particular from 3 to 8.

In particular, polyether alcohols prepared by known methods, for example by anionic polymerization of alkylene oxides in the presence of catalysts, preferably alkali metal hydroxides, are used.

As alkylene oxides, use is usually made of ethylene oxide and/or propylene oxide, preferably pure 1,2-propylene oxide.

Starter molecules used are, in particular, compounds having at least 3, preferably from 4 to 8, hydroxyl groups or at least two primary amino groups in the molecule.

As starter molecules having at least 3, preferably from 4 to 8, hydroxyl groups in the molecule, preference is given to using trimethylolpropane, glycerol, pentaerythritol, sugar compounds such as glucose, sorbitol, mannitol and sucrose, polyhydric phenols, resols such as oligomeric condensation products of phenol and formaldehyde and Mannich condensates derived from phenols, formaldehyde and dialkanolamines and also melamine.

As starter molecules having at least two primary amino groups in the molecule, preference is given to using aromatic diamines and/or polyamines, for example phenylenediamines, 2,3-, 2,4-, 3,4- and 2,6-toluenediamine (TDA) and 4,4'-, 2,4'- and 2,2'-diaminodiphenylmethane, and also aliphatic diamines and polyamines such as ethylenediamine.

The polyether alcohols have a functionality of preferably from 3 to 8 and hydroxyl numbers of preferably from 100 mg KOH/g to 1200 mg KOH/g and in particular from 240 mg KOH/g to 570 mg KOH/g.

In a preferred embodiment of the process of the invention, a mixture of the graft polyol b1), a sucrose-initiated polyether alcohol b2) and a polyether alcohol b3) initiated by means of a trifunctional alcohol or an aromatic amine is used as compounds having at least two hydrogen atoms which are reactive toward isocyanate groups.

The polyether alcohol b2) preferably has a hydroxyl number in the range from 375 to 525 mg KOH/g and a functionality of from 5 to 7.5. The sucrose is usually reacted in admixture with water and/or other bifunctional to trifunctional alcohols which are liquid at room temperature, e.g. ethylene glycol, propylene glycol and/or glycerol, with the alkylene oxides, preferably propylene oxide and/or ethylene oxide. The reaction can be catalyzed by means of alkali metal hydroxides or alkaline earth metal hydroxides or amines.

The polyether alcohol b3) preferably has a hydroxyl number in the range from 100 to 250 mg KOH/g and a functionality of from 3 to 4. As trifunctional alcohols, preference is given to using glycerol or trimethylolpropane. As aromatic amine, preference is given to using TDA, particularly preferably the 2,3 and 3,4 isomers.

In this embodiment of the invention, the component b) comprises from 10 to 25% by weight of the component b1), from 25 to 65% by weight of a sucrose-initiated polyether alcohol b2) and 10-40% by weight of a polyether alcohol b3) initiated by means of an aromatic amine or a trihydric alcohol.

As regards the other starting materials used for the process of the invention, the following details may be provided:

As organic polyisocyanates a), preference is given to aromatic polyfunctional isocyanates.

Specific examples which may be mentioned are: tolylene 2,4- and 2,6-diisocyanate (TDI) and the corresponding isomer mixtures, diphenylmethane 4,4'-, 2,4'- and 2,2'-diisocyanate (MDI) and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic diisocyanates and polyisocyanates can be used individually or in the form of mixtures.

Use is frequently also made of modified polyfunctional isocyanates, i.e. products which are obtained by chemical reaction of organic diisocyanates and/or polyisocyanates. Examples which may be mentioned are diisocyanates and/or polyisocyanates comprising isocyanurate and/or urethane groups. The modified polyisocyanates can, if appropriate, be mixed with one another or with unmodified organic polyisocyanates such as diphenylmethane 2,4'-, 4,4'-diisocyanate, crude MDI, tolylene 2,4- and/or 2,6-diisocyanate.

In addition, reaction products of polyfunctional isocyanates with polyhydric polyols and also their mixtures with other diisocyanates and polyisocyanates can also be used.

Crude MDI having an NCO content of from 29 to 33% by weight and a viscosity at 25° C. in the range from 150 to 1000 mPa s has been found to be particularly useful as organic polyisocyanate.

Further polyols which can be used in place of or in combination with the polyols b2) and b3) have been described above.

The compounds having at least two hydrogen atoms which are reactive toward isocyanate b) also include the chain extenders and crosslinkers which are used if appropriate. The rigid PUR foams can be produced with or without concomitant use of chain extenders and/or crosslinkers. The addition of bifunctional chain extenders, trifunctional and higher-functional crosslinkers or, if appropriate, mixtures thereof can prove to be advantageous for modifying the mechanical properties. As chain extenders and/or crosslinkers, preference is given to using alkanolamines and in particular diols and/or triols having molecular weights of less than 400, preferably from 60 to 300.

Chain extenders, crosslinkers or mixtures thereof are advantageously used in an amount of from 1 to 20% by weight, preferably from 2 to 5% by weight, based on the compounds having at least two hydrogen atoms which are reactive toward isocyanate groups b).

The reaction is usually carried out in the presence of catalysts, blowing agents and customary auxiliaries and/or additives.

Catalysts used are, in particular, compounds which strongly accelerate the reaction of the isocyanate groups with the groups which are reactive toward isocyanate groups.

Such catalysts are strongly basic amines, e.g. secondary aliphatic amines, imidazoles, amidines and also alkanolamines, or organic metal compounds, in particular organic tin compounds.

When isocyanurate groups are also to be incorporated into the rigid polyurethane foam, specific catalysts are required for this. As isocyanurate catalysts, it is usual to use metal carboxylates, in particular potassium acetate and its solutions.

The catalysts can, depending on requirements, be used either alone or in any mixtures with one another.

Water, which reacts with isocyanate groups to eliminate carbon dioxide, can preferably be used as blowing agent. Physical blowing agents can also be used in combination with or in place of water. These are compounds which are inert toward the starting components and are usually liquid at room temperature and vaporize under the conditions of the urethane reaction. The boiling point of these compounds is preferably below 50° C. Physical blowing agents also include compounds which are gaseous at room temperature and are introduced or dissolved in the starting components under pressure, for example carbon dioxide, low-boiling alkanes and fluoroalkanes.

The compounds are usually selected from the group consisting of alkanes and cycloalkanes having at least 4 carbon atoms, dialkyl ethers, esters, ketones, acetals, fluoroalkanes having from 1 to 8 carbon atoms and tetraalkylsilanes having from 1 to 3 carbon atoms in the alkyl chain, in particular tetramethylsilane.

Examples which may be mentioned are propane, n-butane, isobutane and cyclobutane, n-pentane, isopentane and cyclopentane, cyclohexane, dimethyl ether, methyl ethyl ether, methyl butyl ether, methyl formate, acetone and also fluoroalkanes which are degraded in the troposphere and therefore do not damage the ozone layer, e.g. trifluoromethane, difluoromethane, 1,1,1,3,3-pentafluorobutane, 1,1,1,3,3-pentafluoropropane, 1,1,1,2-tetrafluoroethane, difluoroethane and 1,1,1,2,3,3,3-heptafluoropropane and also perfluoroalkanes such as $C_3F_8$, $C_4F_{10}$, $C_5F_{12}$, $C_6F_{14}$ and $C_7F_{17}$. The physical blowing agents mentioned can be used either alone or in any combinations with one another.

The blowing agent particularly preferably comprises at least one aliphatic hydrocarbon which preferably comprises at least 4 carbon atoms. In a preferred embodiment of the process of the invention, this is used in a combination of water and an aliphatic hydrocarbon as blowing agent. Preferred hydrocarbons are n-pentane, isopentane and cyclopentane.

The process of the invention can, if required, be carried out in the presence of flame retardants and customary auxiliaries and/or additives.

As flame retardants, it is possible to use organic phosphoric and/or phosphonic esters. Preference is given to using compounds which are not reactive toward isocyanate groups. The preferred compounds also include chlorine-comprising phosphoric esters.

Typical representatives of this group of flame retardants are triethyl phosphate, diphenyl cresyl phosphate, tris(chloropropyl) phosphate and diethyl ethanephosphonate.

Apart from these, it is also possible to use bromine-comprising flame retardants. As bromine-comprising flame retardants, preference is given to using compounds having groups which are reactive toward the isocyanate group. Such compounds are esters of tetrabromophthalic acid with aliphatic diols and alkoxylation products of dibromobutenediol. Compounds derived from the group consisting of brominated, OH-comprising neopentyl compounds can also be employed.

As auxiliaries and/or additives, it is possible to use the substances known per se for this purpose, for example surface-active substances, foam stabilizers, cell regulators, fillers, pigments, dyes, flame retardants, hydrolysis inhibitors, antistatics, fungistatic and bacteriostatic agents.

Further details regarding the starting materials, blowing agents, catalysts and auxiliaries and/or additives used for carrying out the process of the invention may be found, for example, in the Kunststoffhandbuch, Volume 7, "Polyurethane" Carl-Hanser-Verlag Munich, 1st Edition, 1966, 2nd Edition, 1983, and 3rd Edition, 1993.

To produce the rigid polyurethane foams, the polyisocyanates a) and the compounds having at least two hydrogen atoms which are reactive toward isocyanate groups b) are reacted in such amounts that the isocyanate index is in the range from 100 to 220, preferably from 115 to 195. The rigid polyurethane foams can be produced discontinuously or continuously with the aid of known mixing apparatuses.

In the production of polyisocyanurate foams, the reaction can also be carried out at a higher index, preferably up to 350.

The rigid PUR foams of the invention are usually produced by the two-component process. In this process, the compounds having at least two hydrogen atoms which are reactive toward isocyanate groups b) are mixed with the flame retardants, the catalysts c), the blowing agents d) and the further auxiliaries and/or additives to form a polyol component and this is reacted with the polyisocyanates or mixtures of the polyisocyanates and, if appropriate, blowing agents, also referred to as isocyanate component.

The starting components are usually mixed at a temperature of from 15 to 35° C., preferably from 20 to 30° C. The reaction mixture can be introduced by means of high- or low-pressure metering machines into closed support tools. This technology is employed, for example, to manufacture sandwich elements in a discontinuous manner.

The reaction mixture can also be poured freely or sprayed onto surfaces or into open hollow spaces. Roofs or complicated containers can be insulated in situ by this method.

Continuous mixing of the isocyanate component with the polyol component for producing sandwich elements or insulation elements on double-belt plants is also a preferred embodiment of the process of the invention. In this technology, it is customary to meter the catalysts and the blowing agents into the polyol component by means of further metering pumps. The components used can be divided up into up to 8 individual components in this case. The foaming formulations can, on the basis of the two-component process, be recalculated in a simple manner for the processing of multi-component systems.

The rigid polyurethane foams produced by the process of the invention can be produced with a very short demolding time on the basis of a phase-stable polyol component, which makes significantly reduced cycle times possible. Despite the presence of the graft polyol, large amounts of physical blowing agents are soluble in the polyol component, so that foam densities in the product of less than 30 g/l can be achieved. The foam properties in terms of compressive strength, thermal conductivity and quality of the foam surfaces/formation of voids are excellent.

The invention is illustrated by the following examples.

Measurement Methods

1) The viscosity of the polyols at 25° C. was determined by means of a rotational viscometer Rheotec RC 20 using the spindle CC 25 DIN (spindle diameter: 12.5 mm; internal diameter of measuring cylinder: 13.56 mm) at a shear rate of 50 1/s.
2) The solids content of the graft polyols and the graft polyol mixtures was determined gravimetrically. For this purpose, about 2 g of graft polyol were finely dispersed in about 80 g of isopropanol or methanol in a centrifuge tube. The solid was subsequently separated off in a high-speed centrifuge Sorvall RC 26 Plus at 20 000 rpm (44 670 g). After decantation of the liquid phase present above the solid, the solid was redispersed twice more in isopropanol or methanol, followed by centrifugation and removal of the liquid phase. After drying of the solid at 80° C. and a pressure of <1 mbar for at least two hours in a vacuum drying oven, the percentage solids content was calculated from the mass of the solid separated off and the mass of the graft polyol used.
3) The dielectric constants $\in'$ of the polyols and macromer were determined in accordance with DIN 53483. The values measured at 23° C. and 1000 Hz are reported.
4) The thermal conductivity was determined in accordance with DIN 52616-77. To produce the test specimens, the polyurethane reaction mixture was poured into a mold having dimensions of 200×20×5 cm (10% overfilling) and a test specimen having the dimensions 20×20×2.5 cm was cut from the middle after a few hours.
5) The compressive strength was determined in accordance with DIN 53421/DIN EN ISO 604
6) Curing was determined by means of the indentation test. For this purpose, a steel indenter having a hemispherical end having a radius of 10 mm is pressed to a depth of 10 mm by means of a tensile/compressive testing machine into the foam formed 2, 3 and 4 minutes after the components have been mixed in a polystyrene cup. The maximum force in N required for this is a measure of the curing of the foam. The sum of the measured maximum forces after 2, 3 and 4 minutes is reported in each case.
7) The proportion of closed cells was determined in accordance with ISO 4590.
8) Visual assessment of the cell fineness/foam structure: 1: very fine-celled; 2: fine-celled; 3: slightly coarse-celled; 4: coarse-celled.
9) Visual assessment of the tendency to form bottom defects or voids in the sandwich elements. 1: very smooth surface, no bottom defects/voids on the underside of the sandwich element; 2: very scattered slight bottom defects/voids on the underside of the sandwich element; 3: some bottom defects/voids on the underside of the sandwich element; 4: massive bottom defects over the entire area of the underside of the sandwich element.
10) The burning behavior was determined in the small burner test in accordance with DIN 4102
11) Assessment of curing of the sandwich element at the end of the belt:
   1: minimal change in the element thickness after 24 h
   2: slight change in the element thickness after 24 h
   3: distinct change in the element thickness after 24 h Preparation of the Macromers Dibutyltin dilaurate as esterification catalyst and 3-isopropenyl-α,α-dimethylbenzyl isocyanate (TMI) (0.8 mol per mol of base polyol) were added to the base polyol having a water content of <0.02% by weight at a temperature of 80° C. while stirring. The mixture was stirred at 80° C. for a further hour. Phosphoric acid was subsequently added to deactivate the catalyst and the product was cooled to 25° C. and stabilized with antioxidants.

Preparation of the Graft Polyols

The graft polyols used in the following examples were prepared in continuous processes and discontinuous processes. The synthesis of graft polyols by both processes is known and is described in a series of examples. Thus, the synthesis of graft polyols by the semibatch process is described, for example, in patents such as EP 439 755. A special form of the semibatch process is the semibatch seed process in which a graft polyol is additionally used as seed in the initial charge for the reaction, as described, for example, in EP 510 533. The synthesis of graft polyols having a bimodal particle size distribution is described in WO 03/078496. The synthesis of graft polyols by a continuous process is likewise known and is described, for example, in WO 00/59971.

Graft Polyols Prepared by the Semibatch Process

The preparation of the graft polyols by the semibatch process was carried out in a 2 liter autoclave equipped with a 2-stage stirrer, internal cooling coils and electric heating jacket. Before commencement of the reaction, the reactor was charged with a mixture of carrier polyol and macromer, flushed with nitrogen and heated to the synthesis temperature of 125 or 130° C. In some syntheses, a graft polyol was additionally added as seed to the initial charge for the reaction in addition to the carrier polyol and the macromer. In a further group of experiments, only part of the macromer was placed in the reactor at the beginning. The remaining amount was introduced into the reactor via an independent feed stream during the synthesis.

The remaining part of the reaction mixture comprising further carrier polyol, initiator, the monomers and the reaction moderator was placed in at least two metering containers. The synthesis of the graft polyols was carried out by transferring the raw materials from the metering containers at a constant metering rate via a static in-line mixer into the reactor. The metering time for the monomer/moderator mixture was 150 or 180 minutes, while the polyol/initiator mixture was metered into the reactor over a period of 165 or 195 minutes. After a further after-reaction time of from 10 to 30 minutes at the reaction temperature, the crude graft polyol was transferred via the bottom outlet valve into a glass flask. The product was subsequently freed of the unreacted monomers and other volatile compounds at a temperature of 135° C. under reduced pressure (<0.1 mbar). The end product was subsequently stabilized with antioxidants.

EXAMPLES 1-8

Comparative Examples 1-3

Production of Rigid Foams for Use in Refrigeration Appliances (Machine Foaming)

The various polyols, stabilizers, catalysts are mixed with water and the blowing agent in the ratios indicated in table 1. 100 parts by weight of the polyol component were mixed with the respective amount reported in table 1 of a mixture of diphenylmethane diisocyanate and polyphenylenepolymethylene polyisocyanate having an NCO content of 31.5% by weight and a viscosity of 200 mPas (25° C.) in a Puromat® HD 30 high-pressure foaming machine (Elastogran GmbH). The reaction mixture was injected into a mold having dimensions of 200 cm×20 cm×5 cm or 40 cm×70 cm×9 cm and allowed to foam there. The properties and indices of the foams obtained are reported in table 1.

TABLE 1

|  | Comparative ex. 1 | Comparative ex. 2 | Comparative ex. 3 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- | --- |
| Polyol 1 | 20 | 20 | 20 | 20 | 20 | 20 | 20 | 20 | 20 | 20 |  |
| Polyol 2 | 56.6 | 56.6 | 56.6 | 56.6 | 56.6 | 56.6 | 56.6 | 56.6 | 56.6 | 56.6 | 56.6 |
| Polyol 3 | 18 |  |  |  |  |  |  |  |  |  |  |
| Polyol 4 |  | 18 |  |  |  |  |  |  |  |  |  |
| Polyol 5 |  |  |  |  |  |  |  |  |  |  | 20 |
| Polyol 6 |  |  |  | 18 |  |  |  |  |  |  |  |
| Polyol 7 |  |  |  |  | 18 |  |  |  |  |  |  |
| Polyol 8 |  |  |  |  |  | 18 | 18 | 18 | 18 |  |  |
| Polyol 9 |  |  |  |  |  |  |  |  |  | 18 |  |

TABLE 1-continued

|  | Comparative ex. 1 | Comparative ex. 2 | Comparative ex. 3 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Polyol 10 |  |  |  |  |  |  |  |  |  | 18 |  |
| Polyol 11 |  |  | 18 |  |  |  |  |  |  |  |  |
| Stabilizer 1 | 2 | 2 | 2 | 2 | 2 | 2 | 2 | 2 | 2 | 2 | 2 |
| Water | 2.3 | 2.3 | 2.3 | 2.3 | 2.3 | 2.3 | 2.3 | 2.3 | 2.3 | 2.3 | 2.3 |
| Catalyst 1 | 1.8 | 1.8 | 1.8 | 2.1 | 2.1 | 2.1 | 2.0 | 3.7 | 4.1 | 2.1 | 2.3 |
| Cyclopentane | 9.8 | 9.8 | 9.8 | 9.8 | 9.8 | 9.8 | 14 |  |  | 9.8 | 9.8 |
| Isopentane | 4.2 | 4.2 | 4.2 | 4.2 | 4.2 | 4.2 |  |  |  | 4.2 | 4.2 |
| 141b |  |  |  |  |  |  |  | 35 |  |  |  |
| 245fa |  |  |  |  |  |  |  |  | 35 |  |  |
| EO content of polyol comp. [%] | 3.0 | 4.0 | 4.0 | 3 | 3 | 3.5 | 3.5 | 3.5 | 3.5 | 3.5 | 0 |
| Mixing ratio 100: | 125 | 125 | 125 | 120 | 121 | 121 | 121 | 101 | 101 | 121 | 121 |
| Index | 117 | 117 | 117 | 117 | 117 | 117 | 117 | 117 | 117 | 117 | 117 |
| Fiber time [s] | 43 | 40 | 41 | 38 | 40 | 38 | 42 | 40 | 37 | 40 | 40 |
| Free-foamed density [g/l] | 23.8 | 24.5 | 24.3 | 23.9 | 24.3 | 24.5 | 23.9 | 21.4 | 22.1 | 24.4 | 24.2 |
| Minimum fill density [g/l] | 31.9 | 32.1 | 32.2 | 31.9 | 31.6 | 31.8 | 31.5 | 30.4 | 28.7 | 32.0 | 31.9 |
| Flow factor (min. fill density/free-foamed density) | 1.31 | 1.31 | 1.33 | 1.33 | 1.30 | 1.30 | 1.32 | 1.42 | 1.3 | 1.31 | 1.32 |
| Proportion of open cells [%] | 6 | 5 | 5 | 5 | 5 | 4 | 7 | 7 | 6 | 6 | 6 |
| Thermal conductivity [mW/mK] | 19.7 | 19.6 | 19.9 | 19.7 | 19.8 | 19.5 | 19.2 | 17.0 | 17.5 | 19.8 | 19.6 |
| Compressive strength (RD 31) 20% OP [N/mm$^2$] | 0.16 | 0.16 | 0.15 | 0.14 | 0.15 | 0.15 | 0.15 | 0.13 | 0.13 | 0.15 | 0.15 |
| Further rise after 24 h, 4 min. 20% overpack [mm] | 93.2 | 92.8 | 92.5 | 91.4 | 91.0 | 91.1 | 91.3 | 91.5 | 91.6 | 91.3 | 91.0 |

All polyol components (comparative ex. 1 and 2, examples 1-8) are phase-stable for a minimum of 14 days at room temperature. Only in the case of comparative ex. 3 does the polyol component separate after a few seconds.

The only difference between comparative example 3 and example 8 is the composition of the graft particles which in one case leads to immediate phase separation but in the other case to a storage-stable component. The excess of acrylonitrile over styrene is obviously critical to the phase stability of the polyol component.

EXAMPLES 9-14 AND COMPARATIVE EXAMPLES 4-5

Production of Polyurethane Sandwich Elements by the Double Belt Process

A polyol component was produced from the starting materials shown in table 2 and reacted in the mixing ratio indicated with a mixture of diphenylmethane diisocyanate and polyphenylenepolymethylene polyisocyanates having an NCO content of 31.0% by weight and a viscosity of 520 mPas (25° C.) on a double belt plant to produce a sandwich element having a thickness of 120 mm. The raw materials used and the properties of the sandwich elements are shown in table 2. All foams mentioned here meet the requirements of fire protection class B2 in accordance with DIN4102.

TABLE 2

|  | Comparative ex. 4 | Comparative ex. 5 | Ex. 9 | Ex. 10 | Ex. 11 | Ex. 12 | Ex. 13 | Ex. 14 |
|---|---|---|---|---|---|---|---|---|
| Polyol 12 | 51.1 | 51.1 | 51.1 | 51.1 | 51.1 | 51.1 | 51.1 | 51.1 |
| Polyol 13 | 5 | 5 | 5 | 5 | 5 | 5 | 5 | 5 |
| Glycerol | 4.5 | 4.5 | 4.5 | 4.5 | 4.5 | 4.5 | 4.5 | 4.5 |
| Dipropylene glycol | 0.2 | 0.2 | 0.2 | 0.2 | 0.2 | 0.2 | 0.2 | 0.2 |
| Polyol 6 |  |  | 5 |  |  |  |  |  |
| Polyol 7 |  |  |  | 5 |  |  |  |  |
| Polyol 8 |  |  |  |  | 5 |  |  |  |
| Polyol 9 |  |  |  |  |  | 5 |  |  |
| Polyol 10 |  |  |  |  |  |  | 5 | 4.5 |
| Polyol 11 |  | 5 |  |  |  |  |  |  |
| Flame retardant 1 | 37.5 | 37.5 | 37.5 | 37.5 | 37.5 | 37.5 | 37.5 | 37.5 |
| Stabilizer 2 | 1.8 | 1.8 | 1.8 | 1.8 | 1.8 | 1.8 | 1.8 | 2.3 |
| Water | 2.5 | 2.5 | 2.5 | 2.5 | 2.5 | 2.5 | 2.5 | 2.5 |
| Catalyst 2 | 3.1 | 3.1 | 3.1 | 3.1 | 3.1 | 3.1 | 3.1 | 3.1 |
| n-Pentane | 6 | 6 | 6 | 6 | 6 | 6 | 6 | 6 |

TABLE 2-continued

|  | Comparative ex. 4 | Comparative ex. 5 | Ex. 9 | Ex. 10 | Ex. 11 | Ex. 12 | Ex. 13 | Ex. 14 |
|---|---|---|---|---|---|---|---|---|
| Index | 126 | 126 | 126 | 126 | 126 | 126 | 126 | 126 |
| Cream time [s] | 17 | 17 | 18 | 17 | 16 | 16 | 17 | 17 |
| Fiber time [s] | 45 | 46 | 47 | 45 | 43 | 42 | 44 | 45 |
| Foam density [g/l] | 40 | 40 | 41 | 40 | 39 | 41 | 39 | 40 |
| Element thickness [mm] | 120 | 120 | 120 | 120 | 120 | 120 | 120 | 120 |
| Indentation test [N] | 120 | 145 | 170 | 175 | 180 | 185 | 170 | 180 |
| Proportion of open cells [%] | 8 | 8 | 7 | 6 | 9 | 7 | 6 | 8 |
| Curing at the end of the belt | 3 | 2-3 | 2 | 2 | 1-2 | 1-2 | 2 | 2 |
| Frequency of voids | 3 | 2 | 1-2 | 1-2 | 1-2 | 1-2 | 1-2 | 1-2 |
| Foam structure | 2 | 2 | 2 | 2 | 2 | 2 | 2 | 2 |

Comparative example 5 can only be processed by introducing the polyol 11 into the reaction mixture directly at the mixing head by means of a separate pump; in all other examples and in comparative example 4, all polyols are mixed with the other polyols and flame retardants to give a storage-stable polyol component.

Polyol 1: polyether alcohol based on TDAvic, ethylene oxide and propylene oxide, hydroxyl number: 400 mg KOH/g.
Polyol 2: Polyether alcohol based on sucrose, glycerol and propylene oxide, hydroxyl number: 450 mg KOH/g.
Polyol 3: Polyether alcohol based on trimethylolpropane and propylene oxide, hydroxyl number: 160 mg KOH/g.
Polyol 4: Polyether alcohol based on TDAvic, ethylene oxide and propylene oxide, hydroxyl number: 160 mg KOH/g.
Polyol 5: Polyether alcohol based on TDAvic and propylene oxide, hydroxyl number: 400 mg KOH/g.
Polyol 6: Graft polyol having a hydroxyl number of 72 mg KOH/g, a solids content of 50% by weight and prepared by in-situ polymerization of acrylonitrile and styrene in a mass ratio of 1.1:1 in a carrier polyol based on polypropylene glycol, macromer 2, hydroxyl number: 145 mg KOH/g, dielectric constant $\varepsilon'$ (23° C., 1000 Hz)=5.0
Polyol 7: Graft polyol having a hydroxyl number of 80 mg KOH/g, a solids content of 45% by weight and prepared by in-situ polymerization of acrylonitrile and styrene in a mass ratio of 3:1 in a carrier polyol based on trimethylolpropane and propylene oxide, macromer 1, hydroxyl number: 160 mg KOH/g, dielectric constant $\varepsilon'$ (23° C., 1000 Hz)=5.1
Polyol 8: Graft polyol having a hydroxyl number of 80 mg KOH/g, a solids content of 45% by weight and prepared by in-situ polymerization of acrylonitrile and styrene in a mass ratio of 2:1 in a carrier polyol based on TDAvic and propylene oxide, macromer 1, hydroxyl number: 160 mg KOH/g, dielectric constant $\varepsilon'$ (23° C., 1000 Hz)=5.1
Polyol 9: Graft polyol having a hydroxyl number of 80 mg KOH/g, a solids content of 45% by weight and prepared by in-situ polymerization of acrylonitrile and styrene in a mass ratio of 3:1 in a carrier polyol based on TDAvic and propylene oxide, macromer 1, hydroxyl number: 160 mg KOH/g, dielectric constant $\varepsilon'$ (23° C., 1000 Hz)=5.3
Polyol 10: Graft polyol having a hydroxyl number of 80 mg KOH/g, a solids content of 45% by weight and prepared by in-situ polymerization of acrylonitrile and styrene in a mass ratio of 3:1 in a carrier polyol based on trimethylolpropane and propylene oxide, macromer 1, hydroxyl number: 160 mg KOH/g, dielectric constant $\varepsilon'$ (23° C., 1000 Hz)=5.0
Polyol 11: Graft polyol having a hydroxyl number of 80 mg KOH/g, a solids content of 45% by weight and prepared by in-situ polymerization of acrylonitrile and styrene in a mass ratio of 1:2 in a carrier polyol based on trimethylolpropane and propylene oxide, macromer 1, hydroxyl number: 160 mg KOH/g.
Polyol 12: Polyether alcohol based on sucrose, glycerol and propylene oxide, hydroxyl number: 490 mg KOH/g.
Polyol 13: Polyether alcohol based on ethylenediamine and propylene oxide, hydroxyl number: 770 mg KOH/g.
Macromer 1: 3-isopropenyl-alpha,alpha-dimethylbenzyl isocyanate (TMI) adduct of a polyether alcohol based on sorbitol, propylene oxide, about 25% of ethylene oxide; hydroxyl number of base polyol: 18 mg KOH/g, dielectric constant $\varepsilon'$ (23° C., 1000 Hz)=5.6
Macromer 2: 3-isopropenyl-alpha,alpha-dimethylbenzyl isocyanate (TMI) adduct of a polyether alcohol based on sucrose, propylene oxide; hydroxyl number of base polyol: 25 mg KOH/g, dielectric constant $\varepsilon'$ (23° C., 1000 Hz)=5.6
Stabilizer 1: Tegostab® B8462, Degussa AG
Stabilizer 2: 72% of Tegostab B8466 (from Degussa), 28% of Dabco DC5103 (from Air Products)
Catalyst 1: Mixture of 50% of N,N-dimethylcyclohexylamine, 20% of Lupragen® N301, BASF AG, and 30% of Lupragen® N600, BASF AG.
Catalyst 2: KX315, Elastogran GmbH
Flame retardant 1: Mixture of 53% of trischloropropyl phosphate, 13% of diethyl ethanephosphonate and 34% of Ixol B251 (from Solvay)

The invention claimed is:

1. A process for producing rigid polyurethane foams, comprising:
   reacting
   a) at least one polyisocyanate with
   b) compounds having at least two hydrogen atoms which are reactive toward isocyanate groups in the presence of
   c) blowing agents and a foam stabilizer,
   wherein
   the reaction is conducted in the presence of a catalyst,
   the compounds having at least two hydrogens which are reactive toward isocyanate groups, comprise:
   10 to 25% by weight of at least one graft polyol b1);
   25 to 65% by weight of a sucrose-initiated polyether alcohol b2); and
   10 to 40% by weight of a polyether alcohol b3) obtained by alkoxylation of a vicinal toluene diamine or ethylene diamine;

wherein the at least one graft polyol b1), comprises:
acrylonitrile and styrene in a weight ratio of acrylonitrile:styrene of from greater than 1:1 to 4:1;
a carrier polyether alcohol b1i) having:
a functionality of from 2 to 4,
a hydroxyl number in the range from 100 to 250 mg KOH/g, and
a polyether chain comprising propylene oxide and up to 20% by weight, based on the polyether alcohol b1i), of ethylene oxide, and
at least one compound b1ii) which has at least one olefinic double bond and is miscible with the carrier polyether alcohol b1i).

2. The process according to claim 1, wherein the carrier polyether alcohol b1i) is obtained by addition of alkylene oxides onto at least one of a bifunctional, trifunctional and a tetrafunctional alcohol.

3. The process according to claim 1, wherein the carrier polyether alcohol b1i) is obtained by addition of alkylene oxides onto at least one of a trifunctional and a tetrafunctional alcohol.

4. The process according to claim 1, wherein the polyether chain of the carrier polyether alcohol b1i) comprises up to 10% by weight, based on the carrier polyether alcohol b1i), of ethylene oxide.

5. The process according to claim 1, wherein the compound b1ii) which has at least one olefinic double bond and is miscible with the polyether alcohol b1i) has a molecular weight of from 3000 to 30 000 g/mol.

6. The process according to claim 1, wherein the graft polyol b1) has a content of polymerized particles of at least 35% by weight, based on the weight of the graft polyol b1).

7. The process according to claim 1, wherein the graft polyol b1) is obtained by polymerization of a mixture of acrylonitrile and styrene in a weight ratio of acrylonitrile:styrene of from 2:1 to 4:1.

8. The process according to claim 1, wherein the graft polyol b1) is obtained by polymerization of a mixture of acrylonitrile and styrene in a weight ratio of acrylonitrile:styrene of from 3:1 to 4:1.

9. The process according to claim 1, wherein the graft polyol b1) has a hydroxyl number of 40-150 mg KOH/g.

10. The process according to claim 6, wherein particle size distribution of the graft polyol particles has a maximum in the range from 0.1 μm to 8 μm.

11. The process according to claim 6, wherein the graft polyol particles have a distinctly separated bimodal particle size.

12. The process according to claim 1, wherein the component b1ii) is obtained by reacting a polyether alcohol with a compound having at least one olefinically unsaturated group.

13. The process according to claim 12, wherein the polyether alcohol is obtained by addition of alkylene oxides onto bifunctional to octafunctional alcohols.

14. The process according to claim 12, wherein the polyether alcohol is obtained by addition of alkylene oxides onto tetrafunctional to octafunctional alcohols.

15. The process according to claim 1, wherein the compound which has at least one olefinic double bond and is miscible with the polyether alcohol b1i) is a reaction product of a polyether alcohol with an organic acid comprising at least one olefinic double bond, an organic acid anhydride comprising at least one olefinic double bond or an organic ester comprising at least one olefinic double bond.

16. The process according to claim 1, wherein the compound b1ii) which has at least one olefinic double bond and is miscible with the polyether alcohol b1i) is a reaction product of a polyether alcohol with an isocyanate comprising at least one olefinic double bond.

17. The process according to claim 1, wherein the compounds having at least two hydrogen atoms which are reactive toward isocyanate groups b) comprise from 10 to 25% by weight of the component b1), based on the weight of the component b).

18. The process according to claim 1, wherein the blowing agent c) comprises at least one hydrocarbon.

19. The process according to claim 1, wherein the blowing agent c) comprises at least one aliphatic hydrocarbon having at least 4 carbon atoms.

20. The process according to claim 1, wherein the blowing agent c) comprises at least one aliphatic hydrocarbon having at least 4 carbon atoms and water.

21. A rigid polyurethane foam which is obtained by the process according to claim 1.

22. The process according to claim 10, wherein the maximum of the particle size distribution is in the range from 0.1 μm to 2 μm.

* * * * *